United States Patent
Omura et al.

(10) Patent No.: US 6,559,894 B2
(45) Date of Patent: May 6, 2003

(54) BLOCK-ADAPTIVE EQUALIZATION USING PARTIAL DECISION FEEDBACK IN DIGITAL BROADCAST COMMUNICATIONS

(75) Inventors: Jimmy Kazuhiro Omura, San Francisco, CA (US); Thomas Ross Henderson, Mercer Island, WA (US); Steve Dabell, Spokane, WA (US); Mark Robert Peting, Tigard, OR (US)

(73) Assignee: Digeo, Inc., Kirkland, WA (US)

( * ) Notice: Subject to any disclaimer, the term of this patent is extended or adjusted under 35 U.S.C. 154(b) by 0 days.

(21) Appl. No.: 09/879,662

(22) Filed: Jun. 11, 2001

(65) Prior Publication Data

US 2002/0009135 A1 Jan. 24, 2002

Related U.S. Application Data

(63) Continuation of application No. 09/695,006, filed on Oct. 23, 2000, now abandoned.
(60) Provisional application No. 60/160,473, filed on Oct. 21, 1999, and provisional application No. 60/161,664, filed on Oct. 21, 1999.

(51) Int. Cl.[7] ............................................... H04N 5/217
(52) U.S. Cl. ....................... 348/614; 348/611; 348/725; 375/229; 375/232
(58) Field of Search ................................. 348/611, 613, 348/614; 375/229, 230, 231, 232, 233, 234, 235, 236; H04N 5/217, 5/44

(56) References Cited

U.S. PATENT DOCUMENTS

| | | | | |
|---|---|---|---|---|
| 5,353,307 A | * | 10/1994 | Lester et al. | 375/14 |
| 5,526,378 A | * | 6/1996 | Knutson et al. | 375/229 |
| 5,654,765 A | * | 8/1997 | Kim | 348/614 |
| 5,727,032 A | * | 3/1998 | Jamal et al. | 375/232 |
| 6,377,312 B1 | * | 4/2002 | Limberg et al. | 348/614 |
| 6,437,932 B1 | * | 8/2002 | Prater et al. | 375/233 |

* cited by examiner

*Primary Examiner*—John Miller
*Assistant Examiner*—Trang U. Tran
(74) *Attorney, Agent, or Firm*—Blakely, Sokoloff, Taylor & Zafman

(57) ABSTRACT

A block-adaptive method of performing equalization on a signal received over a broadcast system, includes providing a set of predetermined symbols that correspond to symbols in a data field synchronization segment of a data field having a plurality of segments wherein a data frame having at least two of these data fields is transmitted over the signal in the broadcast system during a block-time interval, correlating complex samples of the signal with the set of predetermined symbols to extract a corresponding impulse response during the block-time interval, selecting a phase identifying the start of the block-time interval from the correlated complex samples, estimating an equalizer filter using the set of predetermined symbols and an initial data field synchronization segment provided at the start of the block-time interval, updating the equalizer filter using subsequent complex samples of the signal to extract a subsequent impulse response and correlate with a reference segment, wherein the reference segment corresponds to either the predetermined symbol sequence or a partial decision feedback segment.

14 Claims, 8 Drawing Sheets

BLOCK-ADAPTIVE EQUALIZATION USING PARTIAL DECISION FEEDBACK IN DIGITAL BROADCAST COMMUNICATIONS

This application is a continuation of U.S. patent application Ser. No. 09/695,006, filed Oct. 23, 2000 now abandoned.

This application claims the benefit of prior U.S. provisional applications 60/160,473, entitled Maximum Likelihood Tracking of Multipath Signal Phases and 60/161,664, entitled A Multipath Tracking Scheme for ATSC Demodulators, both filed Oct. 21, 1999.

TECHNICAL FIELD

This invention relates to the use of equalizers for receivers in the digital television broadcasting industry.

BACKGROUND

Digital technology is rapidly becoming the platform of choice for many types of communication. Sophisticated data compression techniques and the availability of increased digital signal processing capabilities make it possible to transmit much more high quality audio and video information with digital transmission in the same bandwidth as analog channels. In the television broadcast community, the Advanced Television Systems Committee (ATSC) created both the digital television (DTV) standard and the high-definition television (HDTV) standard to take advantage of these technological advances. These standards are often referred to as ATSC digital TV or simply ATSC.

In terrestrial digital television broadcasting, ATSC receivers must receive and convert radio frequency signals into the digital domain. The ATSC standard uses the amplitude modulated suppressed-carrier vestigial sideband modulation technique called VSB. The 8-VSB modulation is designed for use in terrestrial "off air" broadcast systems while the 16-VSB modulation design is for higher-data-rate cable systems.

Errors in these ATSC transmission signals reduce the broadcast signal quality. Transmission conditions contributing to these errors include, for example, multipath signals and interference (co-channel and adjacent-channel) from other analog and digital television signals. In an effort to reduce the effect of these transmission conditions and improve reception, receiver designs include specialized equipment such as high-gain antennas, filters, and digital signal processing techniques.

Adaptive equalizers are used in ATSC receivers to compensate for linear channel distortions from multipath signal components. Multipath channels occur when there are several propagation paths from the transmitter to the receivers. At the receiver, symbols transmitted over these multipath channels may extend over their allotted time interval for transmission and introduce intersymbol interference (ISI). In analog broadcast systems, such as television, the resulting ISI causes voice echoes and video ghosts while in digital systems they typically cause bursts of errors. For a given receiver, an equalizer attempts to cancel the effects of the multipath by applying an inverse filter (a multiplicative inverse in the spectral domain) to the typically non-uniform filter characterizing the multipath in the channel from the transmitter to this receiver.

In addition to radio broadcast systems, early equalizers were also developed for use in telephone networks. These equalizers compensated for the natural filtering of the telephone lines and corresponding distortion of transmitted data pulses and ISI. Many of these early equalization techniques were extended to radio channels where multipath is the primary source of channel distortion. Because the channel conditions are dynamic and not known ahead of time, adaptive equalizers were developed using parameters based on measurements of the received waveform. These types of adaptive equalizers lock on a single multipath signal and incrementally adjust the equalizer parameters each transmitted symbol time interval.

SUMMARY

The details of one or more embodiments of the invention are set forth in the accompanying drawings and the description below. Other features, objects, and advantages of the invention will be apparent from the description and drawings, and from the claims.

In one aspect of the invention, a method of performing equalization on a signal received over a broadcast system, includes providing a set of predetermined symbols that correspond to symbols in a data field synchronization segment of a data field having a plurality of segments wherein a data frame having at least two of these data fields is transmitted over the signal in the broadcast system during a block-time interval, correlating complex samples of the signal with the set of predetermined symbols to extract a corresponding impulse response during the block-time interval, selecting a phase identifying the start of the block-time interval from the correlated complex samples, estimating an equalizer filter using the set of predetermined symbols and an initial data field synchronization segment provided at the start of the block-time interval, updating the equalizer filter using subsequent complex samples of the signal to extract a subsequent impulse response and correlate with a reference segment, wherein the reference segment corresponds to either the predetermined symbol sequence or a partial decision feedback segment.

In another aspect of the invention an apparatus for equalizing a signal received over a broadcast system, includes a predetermined symbol section that stores a set of predetermined symbols corresponding to symbols in a data field synchronization segment of a data field having a plurality of segments wherein a data frame having at least two of these data fields is transmitted over the signal in the broadcast system during a block-time interval, a partial decision feedback section that estimates the sign-bits for symbols transmitted in the signal, a complex corrector that correlates complex samples of the signal with the set of predetermined symbols to extract a corresponding impulse response during the block-time interval and determines the phase identifying the start of the block-time interval, and an estimator that estimates the equalizer using the set of predetermined symbols with an initial data field synchronization provided at the start of the block-time interval and subsequently updates the equalizer using subsequent complex samples of the signal to extract a subsequent impulse response and correlate with reference segment, wherein the reference segment corresponds to either the set of predetermined symbols or a partial decision feedback segment.

A block-adaptive equalizer consistent with the present invention includes one or more of the following uses and advantages. Taking advantage of the ATSC broadcast system transmitting known field synchronization segments every 24.2 millisecond, a measurement of the channel impulse response can be obtained using cross correlation techniques. The estimate of the inverse to the measured impulse response is a channel equalizer filter that can be obtained from the periodic transmission of known frame synchronization segments. The block-adaptive equalizer in this invention extends this cross correlation approach to potentially every transmitted segment resulting in a measurement of the channel impulse response and an updated channel equalizer filter each time a data segment is transmitted every 77.3 microseconds.

Using the block-adaptive equalizer, the collection of multipath signals can be acquired and unlike other designs, it does not depend on any one multipath signal that can fade and cause loss of synchronization in the receiver. Like conventional spread-spectrum rake receivers, correlators within the block-adaptive equalizer provide frequent measurements of the channel impulse response whose inverse provide the channel equalizer filters for this design. These channel impulse responses provided by the correlators are used in implementing a block form of blind equalization necessary for tracking the changing multi-path signals that occur between the frame synchronization segments.

The receiver in this invention synchronizes on block-time intervals of 77.3 microseconds each corresponding to the segment time intervals in the ATSC frame structure rather than synchronizing on a particular multipath signal component in the received waveform. Because the block-adaptive equalizer tracks the collection of multi-path signals in the synchronized block intervals, a receiver implementing this type of equalizer will be more stable and can recover quickly after loss of synchronization.

DESCRIPTION OF DRAWINGS

The accompanying drawings which are incorporated in and constitute a part of this specification, illustrate particular embodiments of the invention, and together with the description, serve to explain the principles of the invention.

Figure 1:
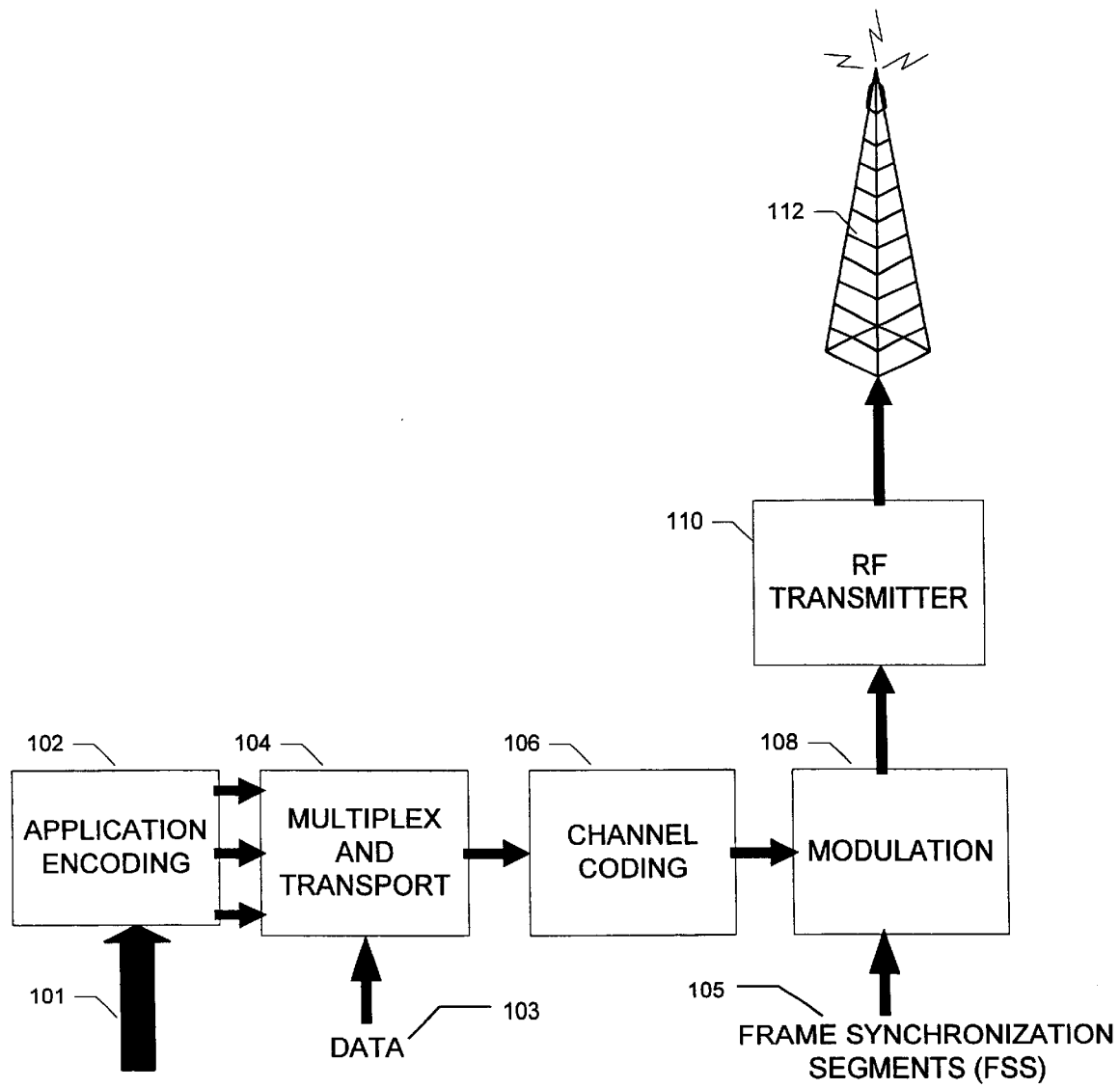
FIG. 1 is a block diagram of the transmitter section used in a digital broadcast communication system.

The major elements of a DTV broadcast transmitter system based on the ATSC standard is shown in FIG. 1. In one implementation, DTV uses the MPEG 2 standard to compress video into data bits and broadcast the data from 3 Mbps to 15 Mbps using a TV signal. The actual data rates achieved depend on the desired reception quality. For example, a 6 MHz bandwidth used for an analog TV channel can be used to transmit 19.2 Mbps in the ATSC terrestrial digital broadcast system. The additional capacity gained by converting to digital broadcast provides broadcasters with the ability to send additional data including multiple TV channels per carrier as is done in digital broadcast satellite (DBS) services and digital cable systems.

In FIG. 1, video and analog signals 101 enter an application encoding section 102 that provides compressed data bits to a multiplex and transport section 104. Data source 103 carries digital information and enters the data stream through multiplex and transport section 104. The resulting data stream is then encoded in channel coding section 106 using a combination of Reed Solomon, interleaving, and trellis encoding.

Modulation section 108 receives data frame synchronization segments (FSS) 105 and inserts FSS 105 in a frame structure along with the data segments from channel coding section 106. In one implementation, the ATSC standard uses an 8-VSB modulation and represents the data segments in the frame with series of 3-bit symbols each corresponding to 8 levels of amplitude. RF transmitter 110 converts the modulated signal to the transmit carrier frequency and sends this to the radio tower 112.

Figure 2:
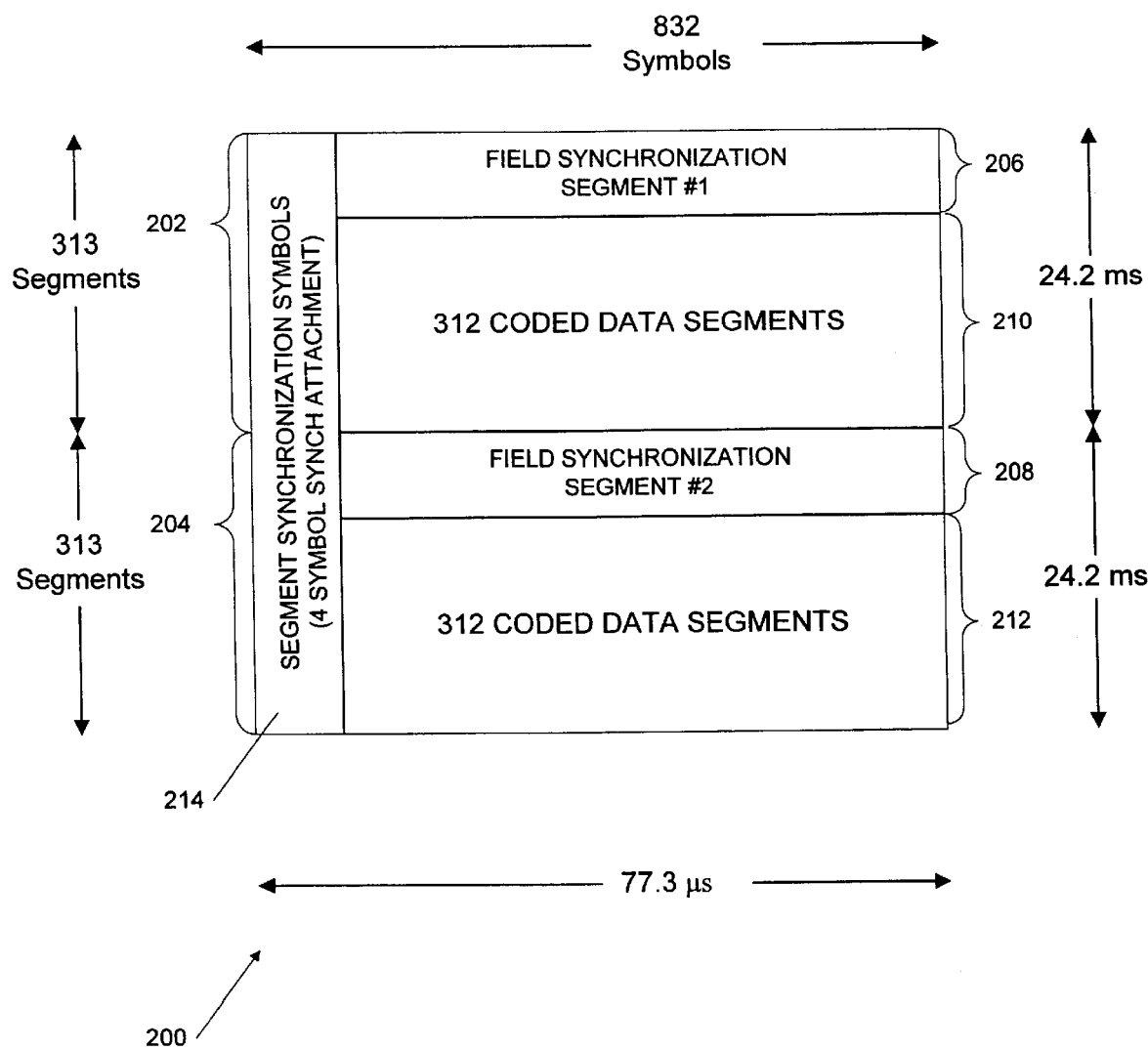
FIG. 2 is a block diagram layout of a typical data frame used in ATSC broadcasts.

The ATSC standard has a data frame structure 200 shown in FIG. 2. Data frame structure 200 includes a first data field 202 and a second data field 204. First data field 202 includes a data field synchronization segment # 1 206 and coded data segments 210 both appended by segment synchronization symbols 214.

In one implementation, field synchronization segment # 1 206 is one segment of 828 symbols carrying a unique training sequence used by the equalizer section within the receiver. Coded data segments 210 include 312 segments wherein each segment corresponds to 188 bytes of data and matches the 188-byte transport packet used in the MPEG-2 protocol. Here four symbols are appended to field synchronization segment #1 206 and coded data segments 210 to provide segment synchronization.

Second data field 204 has the same structure as first data field 202 and includes a field synchronization segment # 2 208 and a coded data segment 212 both also appended by segment synchronization symbols 214. FSS # 2 208 is slightly different from the FSS # 1 206 as defined in the ATSC standard.

Each symbol in data frame structure 200 is a coded 3-bit amplitude symbol 8-VSB modulated onto a carrier frequency along with a pilot tone. In this implementation, the complete data frame structure 200 has 626 segments with each segment having 828 symbols and appended by four segment synchronization symbols 214. 8-VSB modulated symbols can be transmitted at 10.76 M symbols per second and each segment of 832 symbols is transmitted in 77.3 microseconds. Once every 24.2 millisecond, either first data field 202 or second data field 204 is transmitted with a field synchronization segment followed by 312 coded data segments.

Multipath often causes degradation of the received signal in receivers used to receive DTV broadcasts. In general there will be many multipath signals with various amplitudes, phases, and delays. Typically most of the received signal energy is due to multipath delays within 50 microseconds of each other. Since the effects of multipath are linear, the channel between the transmitter and each receiver is modeled well as a channel filter characterized by a channel impulse response. An ideal receiver would use a filter that is the inverse to the channel filter to overcome the effects of this multipath channel distortion. Such a filter is referred to as a channel equalizer filter. Such equalizer filters were first used in telephone networks when increasingly high data rates were transmitted over band-limited telephone lines that filtered and distorted the transmitted signals. Later these types of equalizer filters were applied to radio channels where most of the distortions are due to multipath.

Figure 3:
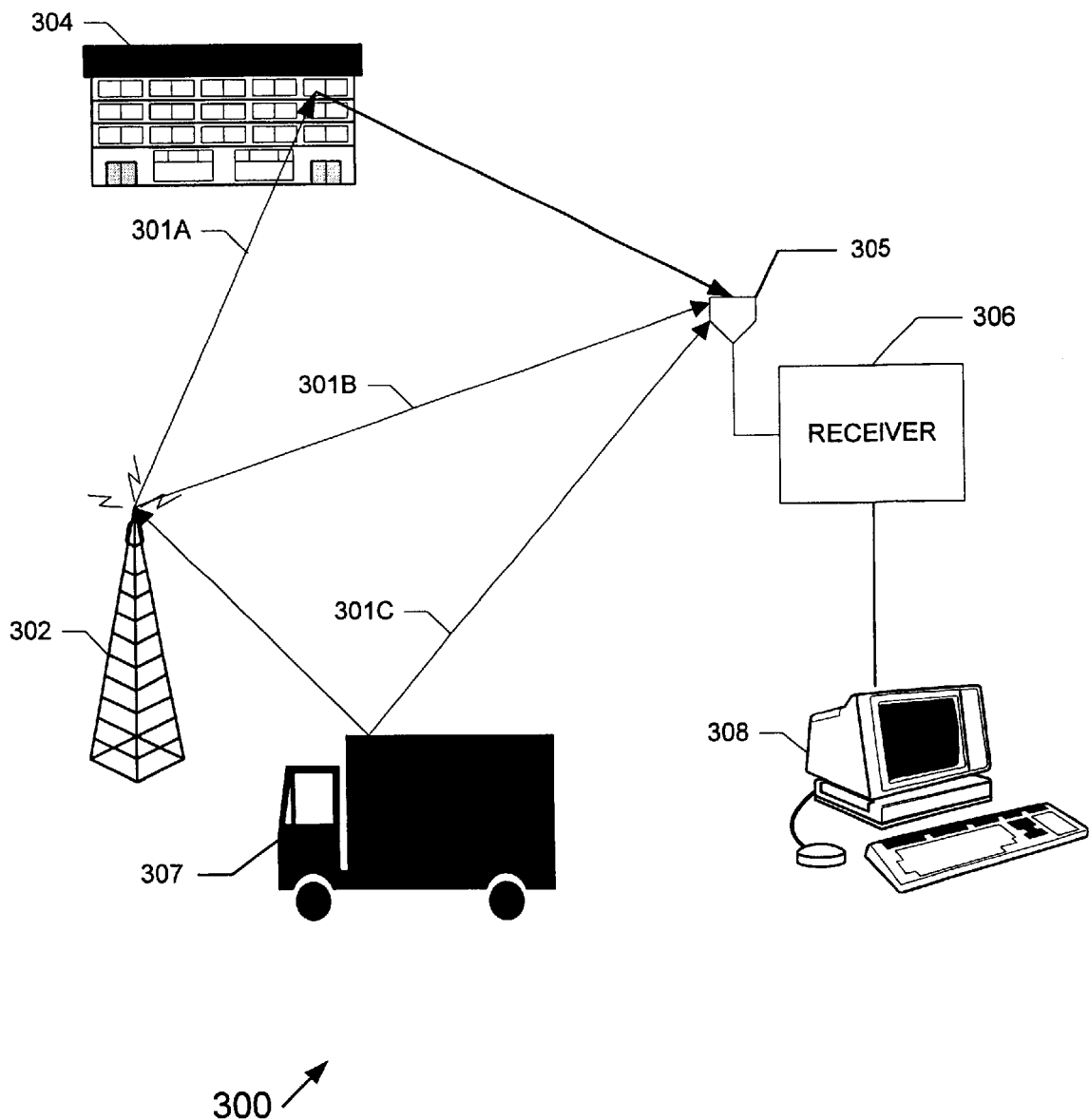
FIG. 3 illustrates the occurrence of multipath signals in a terrestrial broadcast system having both fixed and mobile objects.

FIG. 3 illustrates the occurrence of multipath signals in a terrestrial broadcast system having both fixed and mobile objects. In this example, a broadcast tower 302 transmits a modulated radio frequency signal in all directions. The broadcasted signal travels through the air to a receiver 306 through an antenna 305 over a direct signal path 301B and one or more multiple indirect paths such as signal paths 301A and 301C. Specifically, FIG. 3 shows that signal path 301A has bounced off a building 304 before reaching antenna 305. Another signal path 301C is shown bouncing off a truck 307 before reaching the antenna 305. This latter multipath signal may experience a Doppler shift due to the motion of the truck resulting in a signal at the receiver with a more rapid phase change than the other multipath signals. In contrast to the indirect signal paths, signal 301B travels directly from broadcast tower 302 to antenna 305 and receiver 306.

Generally, the signal energy associated with the various multipath signals arrives at receiver 306 within a 50 microseconds time window of each other. Each multipath signal arriving at receiver 306, however, has it's own amplitude, phase, and delay characteristics.

Because the multipath effects are linear, the channel carrying these multipath signals between a transmitter and a receiver can be modeled using a channel filter and characterized by a channel impulse response. The receiver uses this channel impulse response information to create a filter that overcomes the effects of this multipath distortion. Specifically, the inverse of the channel impulse response (the multiplicative inverse in the spectral domain) is implemented as a channel equalization filter within the receiver. Applying the proper equalization filter to the received waveform removes channel distortion caused by multipath signals.

The present invention provides an adaptive equalizer design that periodically estimates the channel impulse response (and the inverse used for the filter) and adapts to changing channel conditions. This adaptive equalizer design measures the channel impulse response once every block-time interval using cross correlation techniques. Each time a block of symbols are transmitted, the adaptive equalizer estimates the channel impulse response and the corresponding inverse used as the channel equalizer filter. In an ATSC broadcast system, this channel impulse response measurement and channel equalizer filter computation is performed once every block-time interval of 77.3 microseconds.

Initially, the receiver synchronizes on the time segments in the ATSC frame structure of FIG. 2 by using the corresponding block-time intervals as they are received. At the receiver the phase (start time) of the block-time intervals is selected so that the measured impulse responses out of the correlators are captured within the block intervals.

Unlike conventional adaptive equalizers, this design does not detect and lock onto the strongest multipath signal to perform estimates of the channel impulse response. Instead, this adaptive equalizer selects the phase of the block-time intervals over which the estimations are to be performed.

Figure 4:
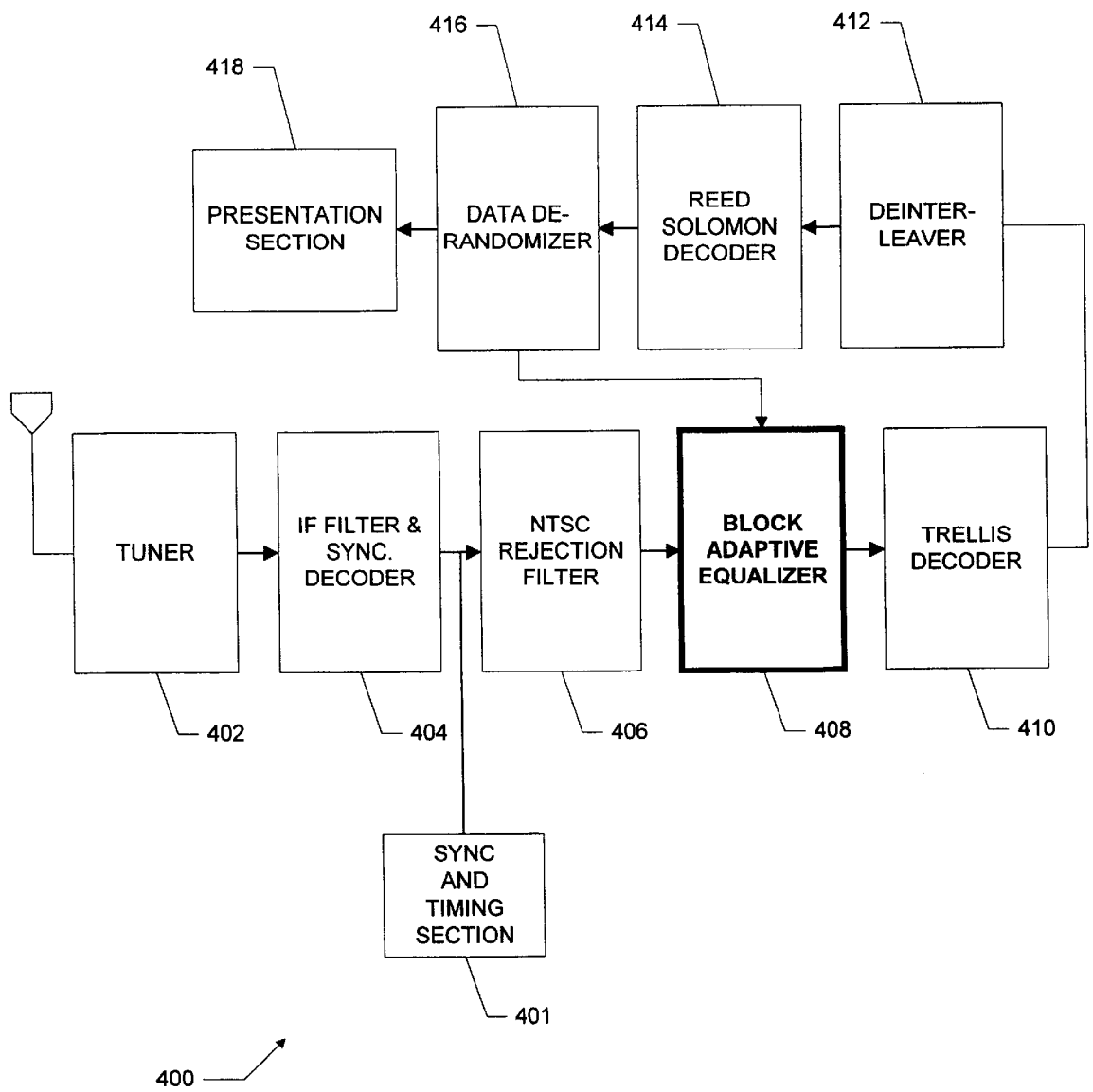
FIG. 4 is a block diagram of the receiver section associated with a digital broadcast communication system.

FIG. 4 illustrates the components used in one implementation of an ATSC receiver 306. In this example, receiver 306 includes a tuner section 402, a synchronization and timing section 401, an IF filter and synchronization decoder 404, an NTSC rejection filter 406, a block-adaptive equalizer 408, a trellis decoder 410, a deinterleaver 412, a Reed-Solomon decoder 414, a data derandomizer 416, and a presentation section 418 for displaying information.

Operation of block-adaptive equalizer 408 in FIG. 4 assists a receiver in maintaining synchronization with a broadcast signal despite the presence of multipath components. Like the receiver, block-adaptive equalizer 408 operates in a continuous tracking mode once synchronized with the received broadcast signal. When there is a loss of synchronization, block-adaptive equalizer 408 reacquires synchronization with the carrier frequency and continues processing multipath components and complex samples. The complex samples are the inphase and quadrature samples of the received waveform based on a fixed phase reference of the acquired carrier frequency.

Block-adaptive equalizer 408 processes the original transmitted broadcast signal and multi-path signals where each has a corresponding amplitude (A), delay (T), and carrier phase (θ). Because of environmental conditions, the carrier phase (θ) component of a given multi-path signal can vary more rapidly than the change in the amplitude (A) and time delay (T). This change in phase can be significant during the 24.2 millisecond data field time interval between field synchronization segments.

This occurs primarily because the objects causing multipath signals normally do not move fast enough in 24.2 milliseconds to cause a significant change in the amplitude and delay of the multi-path signals. In contrast, the phase of the multi-path signals can change a noticeable amount during the 24.2 milliseconds between field synchronization segments. It is assumed that any Doppler shift in the signal is represented by changes in the phase of the multi-path signal.

To track changes in the multi-path signal parameters block-adaptive equalizer 408 performs at least two major estimations. The first estimation of the multi-path parameters is based on complex correlation of the received waveforms with data field synchronization segments in the 8-VSB data field. Block-adaptive equalizer 408 uses this initial estimate as a starting point for subsequent estimates of multi-path parameters during the time intervals between transmissions of the data field synchronization segments.

Figure 5:
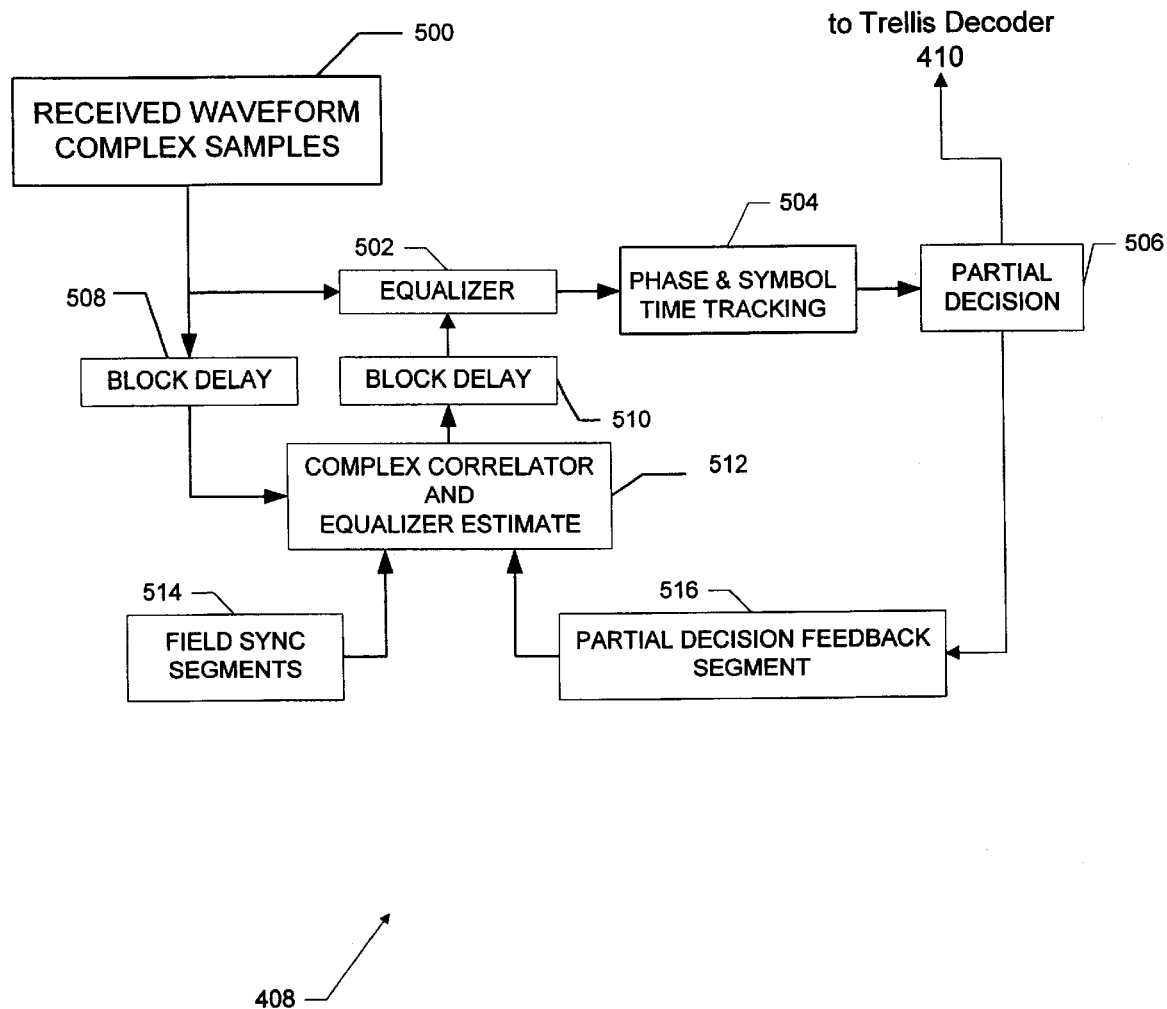
FIG. 5 is a block diagram of a system used to perform block-adaptive equalization with partial decision feedback.

FIG. 5 is a block diagram representation of the architecture used for-adaptive equalizer 408. Block-adaptive equalizer 408 includes a waveform input 500, an equalizer 502, a phase and symbol time tracking section 504, a partial decision section 506, a block delay 508, a block delay 510, a complex corrector and estimator section 512, a data field synchronization segment (FSS) section 514, and a partial decision feedback segment section 516.

While in continuous tracking mode, equalizer 502 receives input from waveform input 500 and filter estimates from complex corrector and estimator section 510. Complex corrector and estimator section 512 receives field sync segment input 514 every 24.2 ms and generates the initial multi-path signal parameter estimates. Between transmissions of the field synchronization segments, complex corrector and estimator section 512 process blocks of data segments received through partial decision feedback segment 516.

Equalizer 502 removes distortion and multipath components from waveform input 500 and provides output to phase and symbol time tracking section 504. In one implementation, symbols with 8 level amplitudes are provided by phase and symbol time tracking section 504 to partial decision section 506 and to trellis decoder 410 in FIG. 4.

Partial decision section 506 estimates only the sign bit of each 3-bit symbol and ignores the lower order bits. This estimation enters partial decision feedback segment section 514 as a binary sequence of 832 bits of data corresponding to the next data segment. Partial decision feedback relies on the principle that an estimate of a current symbol given the contribution of distortion to the current symbol is sufficiently accurate that it can be used to remove similar distortion from subsequently transmitted symbols.

Complex corrector and estimator section 512 receives data from either partial decision feedback segment section 516 or field synchronization segment (FSS) section 514 to estimate the next equalizer. The first of these inputs estimates the equalizer using the sign bits for a sequence of symbols while the latter input estimates the equalizer using a known FSS segment. In either case, complex corrector and estimator section 512 uses the inverse (the multiplicative inverse in the spectral domain) of a channel impulse response when estimating the equalizer for the next block-time interval.

Figure 6:
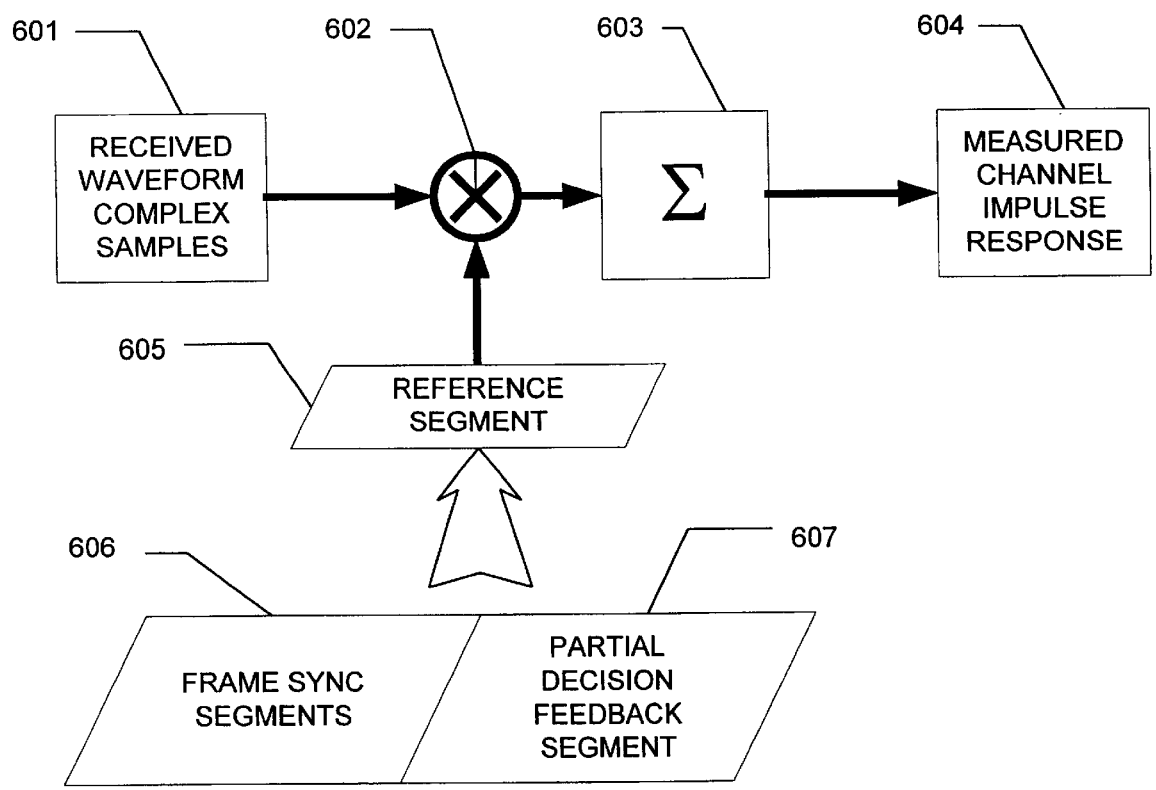
FIG. 6 is a block diagram modeling the operation of the complex correlations and estimation of the channel impulse responses of the block-adaptive equalizer.

FIG. 6 is a block diagram modeling the operation of the complex correlations and estimation of the channel impulse responses of the adaptive equalizer. This model includes received waveform complex samples 601, a multiplier 602, a summer 603, a measured channel impulse response 604, a reference segment 605, frame synchronization segments (FSS) 606, and a partial decision feedback segment 607. Received waveform samples 601 are correlated with a reference segment 605 using multiplier 602 and summer 603. Reference segment 605 is shifted and multiplied in 602 one bit at a time with the received waveform complex samples 601. These received waveform samples 601 may have distortion caused in part by multipath components. Summing the results over the block-time interval in 603 produces a sequence of complex samples that is the measured channel impulse response 604.

Reference segment 605 facilitates continuous updates to the equalizer in each block-time interval and improved processing of multipath signals. In this implementation, either FSS 606 or partial decision feedback segment 607 are used as reference segment 605. Equalizer estimation is simplified because both sources of reference segment 605 are processed in the same manner. In the first case, FSS 606 is a predetermined segment of symbols known in advance and transmitted at fixed time intervals once in each data field. For example, in an ATSC broadcast FSS 606 is transmitted every block-time interval of 24.2 microseconds. Once an FSS block-time interval is identified, the receiver can use FSS 606 as reference segment 605 and estimate a new equalizer.

When the predetermined FSS segment of symbols is not being transmitted, decision feedback correlation and estimation of the equalizer operates identically except the partial feedback segment 607 is used instead. Partial feedback segment 607 is derived using several steps. In FIG. 5, partial decision section 506 computes the sign-bits of the amplitude symbols from the phase and symbol time tracking section 504. The sign-bits are passed to partial decision feedback segment 516 while the complete symbols are passed onto trellis decoder 410. Partial decision feedback segment 516 collects the sign-bits and forms segments for use by the complex correlator and equalizer estimate 512.

Figure 7:
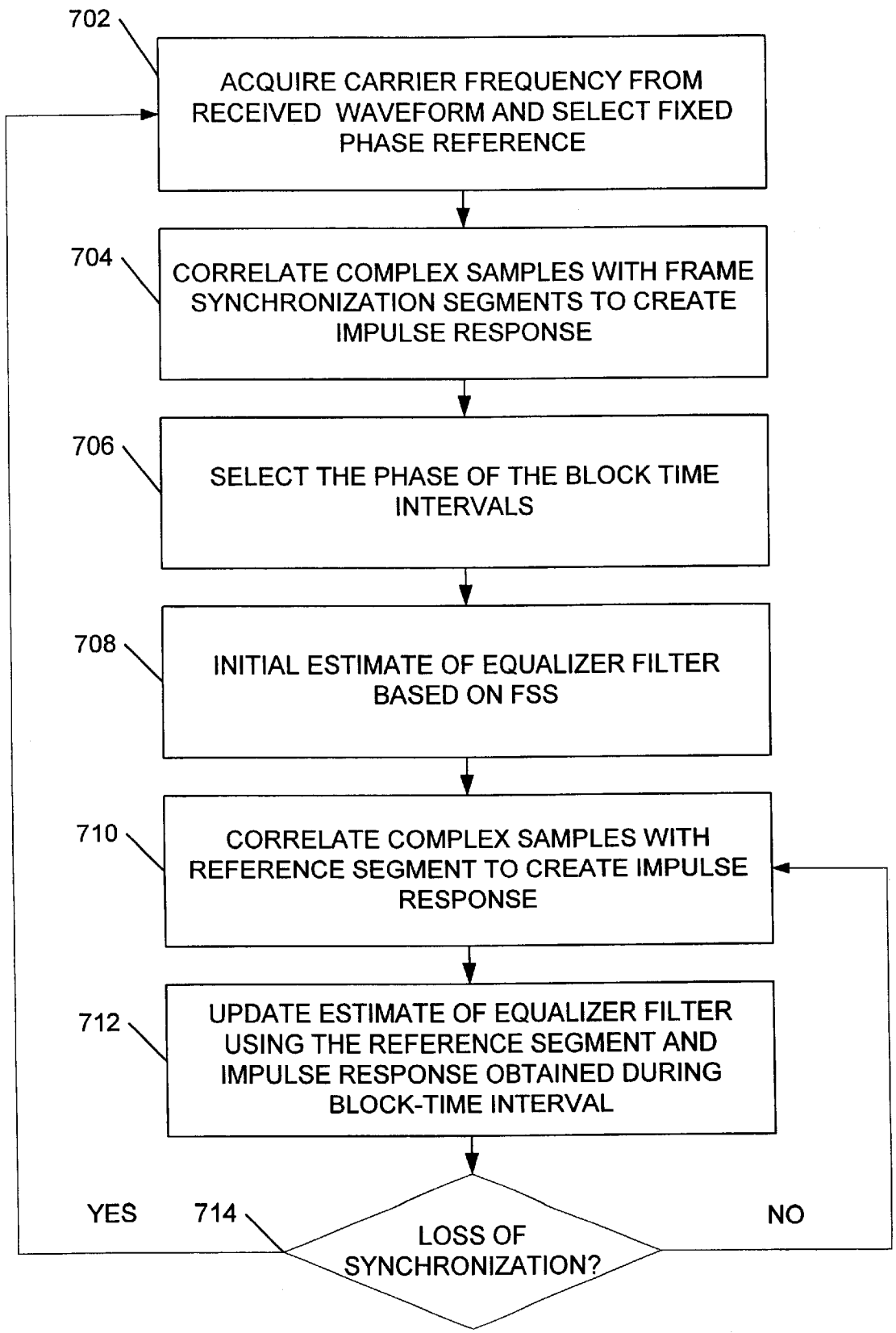
FIG. 7 is a flowchart diagram of the operations used to perform equalization in accordance with the present invention.

FIG. 7 is a flowchart diagram of the operations used to perform block-adaptive equalization in a broadcast receiver. Initially, the receiver acquires the carrier frequency from the received waveform and selects a fixed phase reference (702). Typically, this step occurs within the receiver but outside of the block-adaptive equalizer section. The block-adaptive equalizer continuously cross correlates received complex samples (704) with the predetermined frame synchronization segments (FSS). In ATSC, the FSS is transmitted once every 24.2 milliseconds of a data field. In the time interval during which the frame synchronization segment is transmitted, the output of the cross-correlation with the received complex samples results in a measurement of the channel impulse response (704).

Equalizer 408 establishes an arbitrary phase for the block-time intervals (706) such that the block-time intervals include all of the significant impulse response time functions appearing out of the complex correlation operation. In DTV broadcasts each block-time interval is 77.3 microseconds corresponding to the transmission time of each segment in the ATSC frame structure. Most of the multipath signal delays in the channel are within a 50 microseconds interval and well within each block-time interval. Once the phase of the block-time intervals is fixed then the measured impulse response provides the initial equalizer for the continuous tracking mode operation.

This initial equalizer forms the basis for subsequent updates when the receiver is synchronized and in continuous update mode as described below. Generally, continuous update mode begins once the carrier has been acquired (702) and the initial filter estimate (708) step is completed.

Subsequent complex samples are correlated with the reference segment in continuous updated mode to create an impulse response (710). During the continuous updated mode, the reference segment can be set to either a partial decision feedback segment or the FSS. In one implementation, the partial decision feedback segment uses estimates of the sign-bit of the transmitted symbols and ignores the lower order bit values. The inverse of the impulse response based on the partial decision feedback segment updates (712) the equalizer which then is used to generate the next partial decision feedback segment and impulse response. Alternatively, if the current segment in a block interval corresponds to a fame synchronization segment (FSS), the FSS is used as the reference segment and the equalizer is set according to the impulse response based on the known FSS symbol values. In an ATSC frame shown in FIG. 2, for example, the FSS symbol values is provided every 24.2 milliseconds of the data field. Periodically certain channel conditions may cause the receiver to lose synchronization requiring signal acquisition steps 702, 704, 706, and 708 described above in FIG. 7.

Unlike conventional systems, this invention extends the use of correlation with the known frame synchronization segments to all data segments in the ATSC frame structure shown in FIG. 2. This involves identifying the type of data segments being transmitted and using them in a block decision feedback system with the same correlation structure illustrated in FIG. 6. In this particular case, the FSS and partial decision feedback data segment 607 are both used as reference segment 605.

Figure 8:
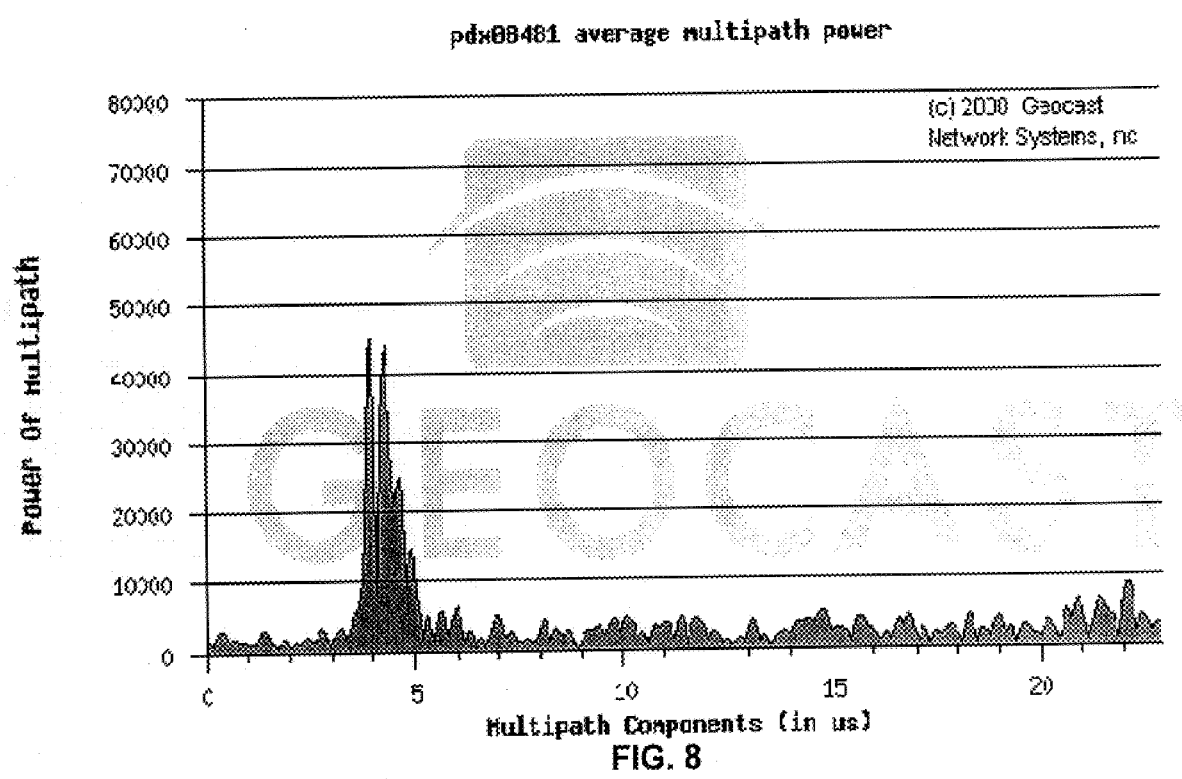
FIG. 8 is a plot illustrating typical measured impulse response components in a multipath environment.

FIG. 8 is an actual measured sequence of the square of the magnitude of the complex impulse response output of a correlator with data taken from receiving DTV broadcast in Portland, Oreg. in 1999. In this example, the majority of the multipath signals are contained within approximately 10 microseconds from the beginning of the sequence with the remaining parts of this signal due to noise and interference in the channel. The block-time interval includes the impulse response due to multipath, which can extend to 50 microseconds but less than 77.3 microseconds of the block interval length. Depending on the particular signal characteristics, the block-adaptive equalizer sets the phase of the block-time intervals for sampling around the "center of mass" of energy in the impulse response output. The phase of the block-time intervals for sampling is then fixed by block-adaptive equalizer 408, so that it includes most of the channel impulse response.

While specific implementations have been described herein for purposes of illustration, various modifications may be made without departing from the spirit and scope of the invention. For example, there are many other systems aspects of the invention that can be used in addition to the ATSC digital television uses described above. Cross correlation techniques described above are useful in radar systems to detect aircraft where a transmitted known bit sequence is bounced off the aircraft and returns to the radar receiver as a multipath signal. Similarly, in GPS satellite systems several satellites transmit different known bit sequences. The GPS receiver cross correlates the received waveform with these sequences to measure the arrival times of the satellite signals thus providing measurements of its relative distances to the satellites which, together with knowing the satellite locations, provide an accurate measure of the GPS receiver's location. In CDMA systems based on the U.S. digital cellular standard IS-95, correlation with spreading codes can be used to both combat interference and take advantage of multipath using an adaptive RAKE receiver. Furthermore, although aspects of the present invention are described as being stored in memory and other storage mediums, one skilled in the art will appreciate that these aspects can also be stored on or read from other types of computer-readable media, such as secondary storage devices, like hard disks, floppy disks, or CD-ROM; a carrier wave from the Internet; or other forms of RAM or ROM. Accordingly, the invention is not limited to the above-described embodiments, but instead is defined by the appended claims in light of their full scope of equivalents.

What is claimed is:

1. A method of performing equalization on a signal received over a broadcast system, comprising:
   providing a set of predetermined symbols that correspond to symbols in a data field synchronization segment of a data field having a plurality of segments wherein a data frame having at least two of these data fields is transmitted over the signal in the broadcast system during a block-time interval;
   correlating complex samples of the signal with the set of predetermined symbols to extract a corresponding impulse response during the block-time interval;
   selecting a phase identifying the start of the block-time interval from the correlated complex samples;
   estimating an equalizer filter using the set of predetermined symbols and an initial data field synchronization segment provided at the start of the block-time interval;
   updating the equalizer filter using subsequent complex samples of the signal to extract a subsequent impulse response and correlate with a reference segment, wherein the reference segment corresponds to either the predetermined symbol sequence or a partial decision feedback segment.

2. The method of claim 1, wherein the set of predetermined symbols corresponds to the data field synchronization segment of an ATSC digital television signal system.

3. The method of claim 1, wherein the updating of the equalizer filter occurs continuously once the equalizer is estimated and the signal remains synchronized.

4. The method of claim 1, wherein the partial decision feedback segment used to update the equalizer filter is derived by estimating the sign-bit of symbols being transmitted in the signal.

5. The method of claim 1, wherein the reference segment used to update the equalizer is set to the predetermined symbol sequence when a subsequent data field synchronization segment is transmitted in the subsequent impulse response.

6. The method of claim 1, wherein the reference segment used to update the equalizer is set to the partial decision feedback segment when a subsequent data field synchronization segment is not transmitted in the subsequent impulse response.

7. An apparatus for equalizing a signal received over a broadcast system, comprising:
   a predetermined symbol section that stores a set of predetermined symbols corresponding to symbols in a data field synchronization segment of a data field having a plurality of segments wherein a data frame having at least two of these data fields is transmitted over the signal in the broadcast system during a block-time interval;
   a partial decision feedback section that estimates the sign-bits for symbols transmitted in the signal;
   a complex correlator that correlates complex samples of the signal with the set of predetermined symbols to extract a corresponding impulse response during the block-time interval and determines the phase identifying the start of the block-time interval; and
   an estimator that estimates the equalizer using the set of predetermined symbols with an initial data field synchronization provided at the start of the block-time interval and subsequently updates the equalizer using subsequent complex samples of the signal to extract a subsequent impulse response and correlate with reference segment, wherein the reference segment corresponds to either the set of predetermined symbols or a partial decision feedback segment.

8. The apparatus of claim 7, wherein the set of predetermined symbols corresponds to a data field synchronization segment in an ATSC digital television signal system.

9. The apparatus of claim 7, wherein the complex correlator and estimator update the equalizer filter continuously once the equalizer is initialized and the signal remains synchronized.

10. The apparatus of claim 7, wherein the partial decision feedback segment used to update the equalizer filter is derived by estimating the sign-bit of symbols transmitted in the signal.

11. The apparatus of claim 7, wherein the reference segment used to update the equalizer is set to the predetermined symbol sequence when a subsequent data field synchronization segment is transmitted in the subsequent impulse response.

12. The apparatus of claim 7, wherein the reference segment used to update the equalizer is set to the partial decision feedback segment when a subsequent data field synchronization segment is not transmitted in the subsequent impulse response.

13. An apparatus for performing equalization on a signal received over a broadcast system and acquired, comprising:
   means for providing a set of predetermined symbols that correspond to symbols in a data field synchronization segment of a data field having a plurality of segments wherein a data frame having at least two of these data fields is transmitted over the signal in the broadcast system during a block-time interval;
   means for correlating complex samples of the signal with the set of predetermined symbols to extract a corresponding impulse response during the block-time interval;

means for selecting a phase identifying the start of the block-time interval from the correlated complex samples;

means for estimating an equalizer filter using the set of predetermined symbols and an initial data field synchronization segment provided at the start of the block-time interval;

means for updating the equalizer filter using subsequent complex samples of the signal to extract a subsequent impulse response and correlate with a reference segment, wherein the reference segment corresponds to either the predetermined symbol sequence or a partial decision feedback segment.

14. Apparatus comprising a computer-readable storage medium tangibly embodying program instructions for performing equalization on a signal received over a broadcast system, the program instructions including instructions operable to cause a programmable process to:

provide a set of predetermined symbols that correspond to symbols in a data field synchronization segment of a data field having a plurality of segments wherein a data frame having at least two of these data fields is transmitted over the signal in the broadcast system during a block-time interval;

correlate complex samples of the signal with the set of predetermined symbols to extract a corresponding impulse response during the block-time interval;

select a phase identifying the start of the block-time interval from the correlated complex samples;

estimate an equalizer filter using the set of predetermined symbols and an initial data field synchronization segment provided at the start of the block-time interval;

update the equalizer filter using subsequent complex samples of the signal to extract a subsequent impulse response and correlate with a reference segment, wherein the reference segment corresponds to either the predetermined symbol sequence or a partial decision feedback segment.

* * * * *